(12) United States Patent
McGillycuddy

(10) Patent No.: US 9,297,541 B1
(45) Date of Patent: Mar. 29, 2016

(54) UNDERLAYMENT HEATING SYSTEMS AND METHODS

(71) Applicant: Augusta Glen Partners, Suffern, NY (US)

(72) Inventor: Eugene B. McGillycuddy, Suffern, NY (US)

(73) Assignee: AUGUSTA GLEN PARTNERS, Suffern, NY (US)

(*) Notice: Subject to any disclaimer, the term of this patent is extended or adjusted under 35 U.S.C. 154(b) by 321 days.

(21) Appl. No.: 13/801,455

(22) Filed: Mar. 13, 2013

(51) Int. Cl.
*H05B 1/00* (2006.01)
*F24D 13/00* (2006.01)

(52) U.S. Cl.
CPC ..................... *F24D 13/00* (2013.01)

(58) Field of Classification Search
CPC ................... H05B 3/06; H05B 3/34
USPC ......... 219/213, 490, 494, 541–545, 549, 528, 219/529
See application file for complete search history.

(56) References Cited

U.S. PATENT DOCUMENTS

| | | | |
|---|---|---|---|
| 2,546,743 A | 3/1951 | Harrison | |
| 2,912,555 A | 11/1959 | Jamison | |
| 3,129,316 A | 4/1964 | Glass | |
| 3,691,343 A | 9/1972 | Norman | |
| 3,806,702 A | 4/1974 | Spencer | |
| 4,485,297 A | 11/1984 | Grise et al. | |
| 5,813,184 A | 9/1998 | McKenna | |
| 5,961,869 A | 10/1999 | Irgens | |
| 6,037,572 A * | 3/2000 | Coates et al. | 219/451.1 |
| 6,166,352 A | 12/2000 | Turton | |
| 6,184,495 B1 | 2/2001 | Jones | |
| 6,184,496 B1 | 2/2001 | Pearce | |
| 6,215,102 B1 | 4/2001 | Jones | |
| 6,297,475 B2 | 10/2001 | Jones | |
| 6,489,594 B2 | 12/2002 | Jones | |
| 6,708,452 B1 | 3/2004 | Tenute | |
| 6,727,471 B2 | 4/2004 | Evans et al. | |
| 6,847,018 B2 | 1/2005 | Wong | |
| 6,875,954 B2 | 4/2005 | DeBenedetto et al. | |
| 6,959,512 B2 | 11/2005 | Cobb | |
| 6,978,577 B2 | 12/2005 | Jones | |
| 7,071,446 B1 | 7/2006 | Bench | |
| 8,158,231 B2 | 4/2012 | Hopkins et al. | |

(Continued)

OTHER PUBLICATIONS

International Search Report and Written Opinion issued by the U.S. Patent and Trademark Office as International Searching Authority for International Application No. PCT/US12/032552 mailed Jul. 13, 2012 (7 pgs.).

*Primary Examiner* — Brian Jennison
(74) *Attorney, Agent, or Firm* — Wilmer Cutler Pickering Hale and Dorr LLP

(57) ABSTRACT

An underlayment heating system for use with flooring, the system including an underlayment layer, a vapor barrier layer, a thin film radiant heater layered between at least part of the underlayment layer and the vapor barrier layer, wherein the thin film radiant heater includes a substrate, a conductive resistive ink pattern disposed on the substrate, wherein the ink pattern generates heat when electricity passes through the resistive ink pattern, wherein the underlayment heating system includes overlap portions that extend along opposing longitudinal edges of the system, and wherein the thin film radiant heater is layered between the underlayment layer and the vapor barrier layer such that the resistive ink pattern is disposed outside of the overlap portions of the underlayment heating system.

20 Claims, 6 Drawing Sheets

(56) References Cited

U.S. PATENT DOCUMENTS

| | | |
|---|---|---|
| 2002/0124476 A1 | 9/2002 | Iannelli |
| 2004/0004066 A1 | 1/2004 | Evans et al. |
| 2004/0195226 A1 | 10/2004 | Stabile |
| 2004/0244324 A1 | 12/2004 | McKenna |
| 2005/0210758 A1 | 9/2005 | Iannelli |
| 2006/0048456 A1 | 3/2006 | Iannelli |
| 2006/0289110 A1 | 12/2006 | Schmitt et al. |
| 2007/0012845 A1 | 1/2007 | Iannelli |
| 2008/0029654 A1 | 2/2008 | Iannelli |
| 2009/0031638 A1 | 2/2009 | Iannelli |
| 2010/0065543 A1* | 3/2010 | Dubey et al. .......... 219/213 |
| 2012/0198691 A1 | 8/2012 | Hopkins et al. |
| 2014/0097178 A1 | 4/2014 | Whitcraft |
| 2014/0263266 A1 | 9/2014 | Jenkins et al. |

* cited by examiner

UNDERLAYMENT HEATING SYSTEMS AND METHODS

BACKGROUND

Houses are typically built with heating, ventilation, and air conditioning (HVAC) systems to control the temperature of indoor air. Alternatively, there are other ways of controlling the temperature, such as, for example, underfloor radiant heating and radiant cooling systems. Underfloor heating systems can have advantages over the widely used HVAC systems. For example, underfloor radiant heating systems can provide better indoor air quality and moisture control, reduce mold and bacteria, and reduce allergens because they use convection, rather than forced air, to transfer energy (i.e., reducing the amount of bacteria and mold that is circulated by blowing air). In addition, underfloor heating systems may use less energy for the same amount of temperature control because radiant systems typically use lower operating temperatures and faster warm up times as compared to other types of systems.

Two types of modern underfloor radiant heating systems include hydronic systems and electric systems. Hydronic systems typically heat the floor by circulating a solution consisting of water and anti-freeze in a closed loop under the floor using a complex series of tubes and/or pipes, which can be time consuming to install and expensive to operate (e.g., requiring separate equipment to heat the solution). On the other hand, electric systems typically pass electricity through electrical resistance elements to generate heat. Existing electrical systems typically use resistive wires to generate heat, which can be fragile and subject to breakage.

Regardless of the type of radiant underfloor heating system, the installation process can be cumbersome due to the number of separate layers that must be installed in separate steps. For example, layers such as an underlayment and vapor barrier can be used with flooring systems. The vapor barrier layer can protect the floor from moisture and the underlayment layer can serve several purposes such as providing cushioning, noise dampening, insulation, and foot comfort. Because of such functionalities, a vapor barrier layer and underlayment layer can increase the lifetime of a floor. However, as noted above, these layers are typically installed as separate layers, requiring additional installation time and expense.

SUMMARY

In general, in an aspect, embodiments of the disclosed subject matter provide an underlayment heating system for use with flooring, the system including an underlayment layer, a vapor barrier layer, a thin film radiant heater layer disposed between at least part of the underlayment layer and the vapor barrier layer, wherein the thin film radiant heater layer includes a substrate, and a conductive resistive ink pattern disposed on the substrate, wherein the ink pattern generates heat when electricity passes through the resistive ink pattern. The underlayment heating system includes overlap portions that extend along opposing longitudinal edges of the system, and wherein the thin film radiant heater layer is provided between the underlayment layer and the vapor barrier layer such that the resistive ink pattern is disposed outside of the overlap portions of the underlayment heating system.

Various aspects of the disclosed subject matter can provide one or more of the following capabilities and benefits. Installation of radiant underfloor heating systems can be simplified as compared to prior systems. A simplified installation process as used by the embodiments of the disclosed subject matter can prevent or at least minimize electrical and/or mechanical failure of the heating system and/or floor due to improper installation because there are no moving parts involved. The cost and time to install a radiant underfloor heating system can be reduced because there are fewer layers to install. A radiant heating system can be combined with a traditional floor underlayment system to create a combined radiant underfloor underlayment system. The radiant underfloor underlayment system can function as a barrier against impact, moisture, and heat.

These and other capabilities of the disclosed subject matter will be more fully understood after a review of the following figures, detailed description, and claims.

DETAILED DESCRIPTION

Embodiments of the disclosed subject matter provide techniques for combining a radiant underfloor heating system with an underlayment used under a flooring system. An underlayment heating system can include an underlayment layer, a thin film radiant heater layer, and a vapor barrier layer bonded together using adhesive. The underlayment heating system can be used in combination with another heating system, including a standard HVAC system, or as a stand-alone heating system. Other embodiments are within the scope of the disclosed subject matter.

Figure 1:
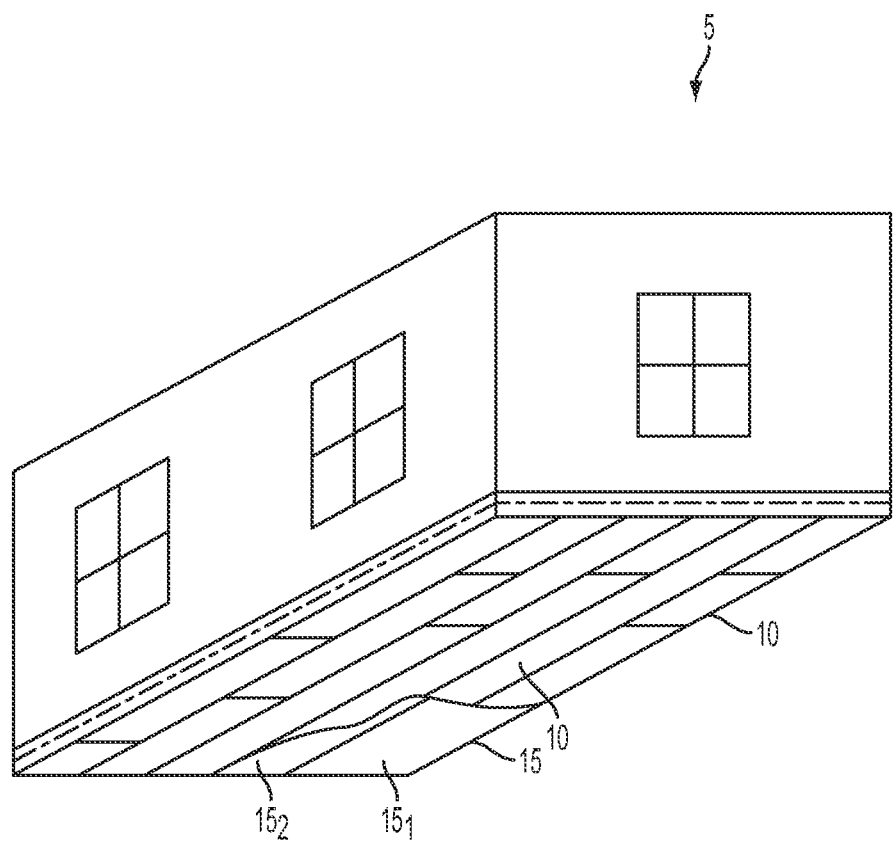
FIG. 1 shows an internal view of a room including an example of a heated flooring system having an underlayment heating system and a floor in accordance with an embodiment of the disclosed subject matter.

Referring to FIG. 1, an inside view of a room 5 is shown. Within the room 5, a heated flooring system, which includes a floor 10 and an underlayment heating system 15, is shown. The floor 10 can be, for example, a floating hardwood floor, an engineered hardwood floor, a laminate floor, and carpet. The underlayment heating system 15 preferably includes several layers, which are described more fully below. In a typical installation, the underlayment heating system 15 is placed on the subfloor (e.g., plywood or concrete slab) and the floor 10 is placed on top of the underlayment heating system 15. The underlayment heating system 15 can be, for example, glued to the subfloor, nailed to the subfloor, or can float above the subfloor (e.g., not fastened to the subfloor). The underlayment heating system 15 can be installed such that adjacent rows (e.g., 15₁ and 15₂) partially overlap one another. The floor 10 can, for example, be glued to the heating system 15, be nailed to the subfloor (e.g., through areas of the heating system 15 that do not conduct electricity), or float above the heating system 15.

The underlayment heating system 15 can provide several advantages. For example, the underlayment heating system 15 can be installed in a single step, rather than separate steps typically required for installing individual layers of underlayment, heater, and vapor barrier. The underlayment heating system 15 can function to heat the floor 10, and consequently heat the ambient air in the room 5. The underlayment heating system 15 can function as a vapor barrier preventing moisture from the subfloor (not shown) from affecting the floor 10. The underlayment heating system 15 can be provided in one or more different form factors such as a roll and a sheet (e.g., a sheet of rigid foam insulation). While the foregoing description focuses on a sheet, the discussed subject matter is not limited to this form factor and is contemplated to be manufactured and installed in other forms.

Figure 2:
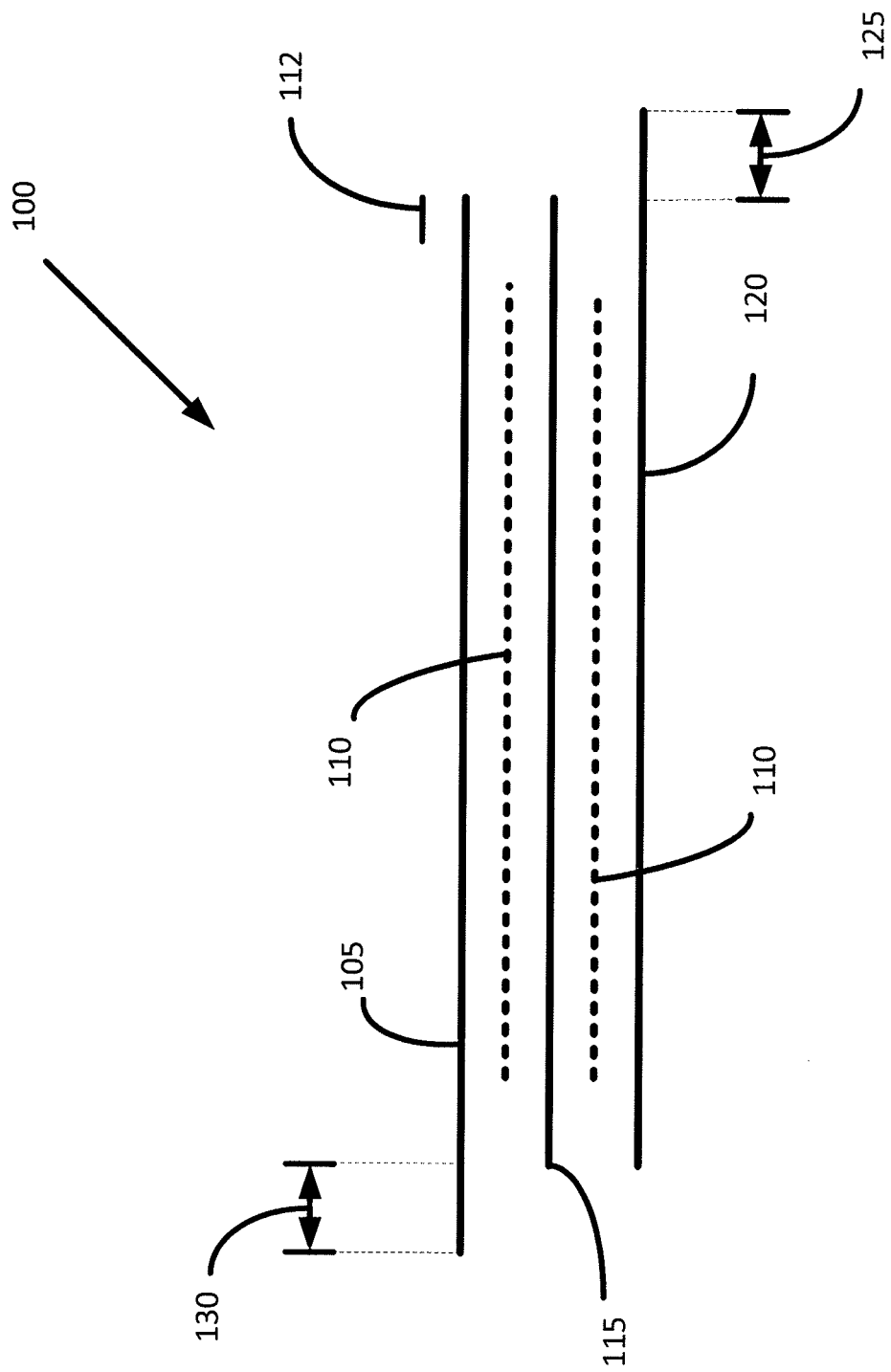
FIG. 2 shows an exploded cross-sectional view of an exemplary underlayment heating system taken along the line I-I in FIG. 3 in accordance with an embodiment of the disclosed subject matter.
Figure 3:
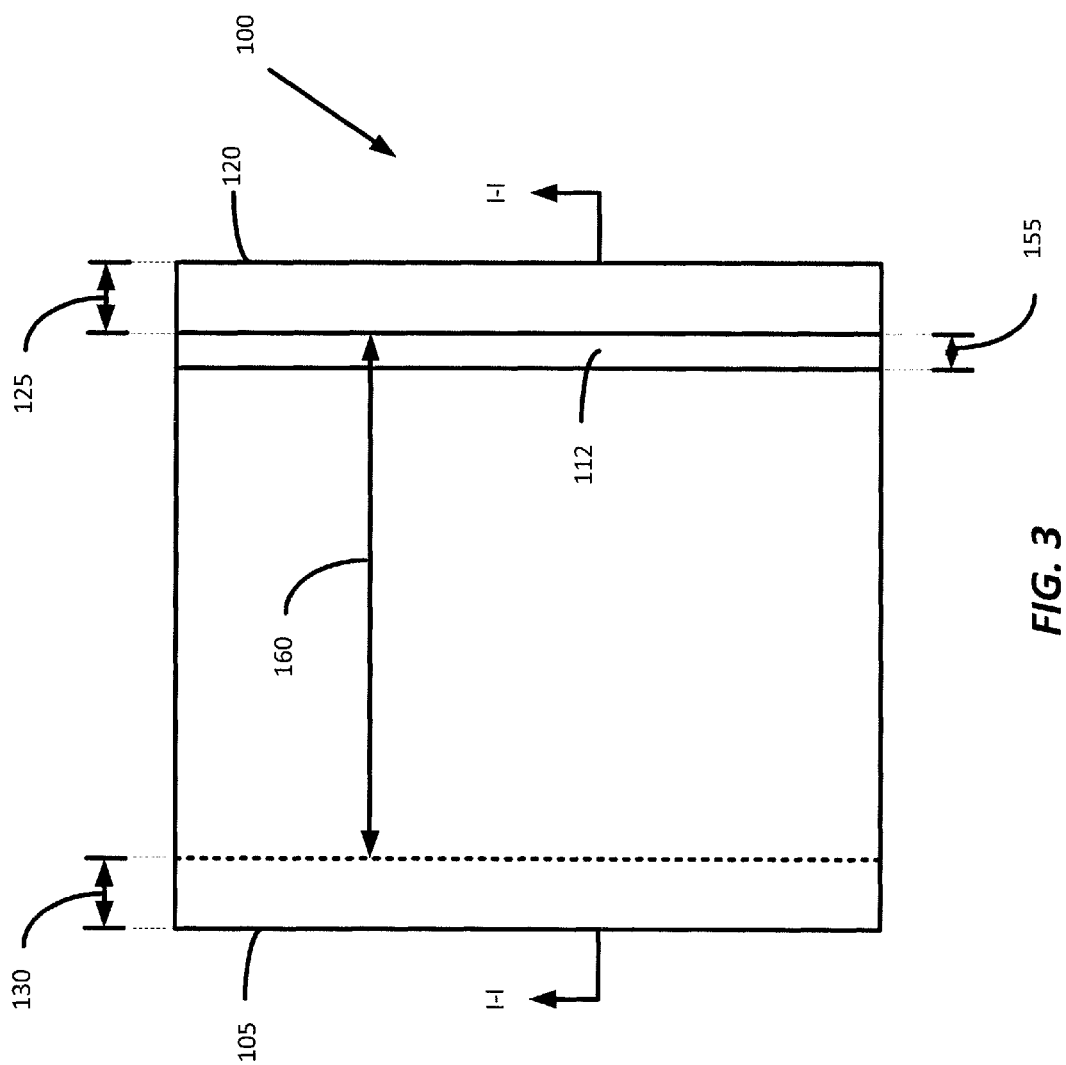
FIG. 3 shows a top down view of an exemplary underlayment heating system in accordance with an embodiment of the disclosed subject matter.

Referring to FIGS. 2-3, an exemplary embodiment of the underlayment heating system 15 is shown as heating system 100. The heating system 100 can include a vapor barrier layer 105, a thin film radiant heater 115, and an underlayment layer 120. In order to laminate (e.g., bond together) the thin film radiant heater 115 between the two other layers, adhesive layers 110 can be used. The heating system 100 can also include an adhesive strip 112 along one or more sides (e.g. longitudinal and/or transverse sides). Preferably, one side of the vapor barrier 105 extends beyond the thin film radiant heater 115 a distance 130, and one side of the underlayment layer 120 extends beyond the thin film radiant heater 115 a distance 125. Thus, a width 160 represents an area where all three layers are present. In such embodiments, the heating system 100 can include opposing longitudinal edges that do not include the radiant heater 115 (e.g., the radiant heater 115 is only present across distance 160). In some embodiments, one or both of the vapor barrier layer 105 and the underlayment layer 120 do not extend beyond the thin film radiant heater 115. Additionally, the underlayment heating system 15 can also include overlap portions along its transverse edges as well.

While the foregoing description describes the thin film radiant heater 115 as being laminated between the vapor barrier layer 105 and the underlayment layer 120, other configurations are possible. For example, the layers can be laminated in a different order, some of the layers can be omitted (e.g., the vapor barrier), and/or additional layers can be added (e.g., a sound absorption layer, flame retardant layer, etc.). Instead of using a separate flame retardant layer, each of the various layers themselves may be made flame retardant using, for example, chemical additives.

The vapor barrier layer 105 can be, for example, plastic, treated paper, polyethylene plastic sheet, and/or other moisture impervious films. Virtually any material can be used so long is it impedes or prevents the transmission of moisture and/or liquid.

The adhesive layers 110 can be, for example, pressure sensitive adhesive or heat activated adhesive. The adhesive can be selectively placed to allow for crimping of the electrical connection. For example, the adhesive can be applied to approximately 60% of the center of the heating system 100 such that electrical connections to the thin film radiant heater layer 115 can be made.

The makeup of the underlayment layer 120 can vary depending on the type of flooring it is used with. When laid beneath carpeting, the underlayment layer 120 can be, for example, a rebond, frothed foam, foam, waffle rubber, slab rubber, fiber, and/or closed cell foam. Preferably, when laid beneath carpeting, the underlayment layer 120 is installed with a layer of luan or regular plywood (e.g., 0.125-0.25") over it. When laid below wood and laminate floors, the underlayment layer 120 can be, for example, foam, a combination of film and combustion foam, an elastomer (e.g., styrene butadiene, butyl, ethylene propylene, nitrile, neoprene, urethane, silicone, butadiene), fiber, and/or cork. When laid below resilient flooring, the underlayment 120 can be, for example, a hardboard, particleboard, oriented strand board, and/or plywood.

The adhesive strip 112 can be used to create a continuous vapor barrier. For example, multiple heating systems 100 can be partially overlapped using an adhesive strip 112. As described above, the heating system 100 is preferably configured so that the vapor barrier layer 105 and/or the underlayment layer 120 extends beyond the thin film radiant heater 115. Using this configuration, multiple rows of the underlayment heating system can be placed next to one another in a partially overlapping manner such that adjacent thin film radiant heaters 115 do not overlap with one another. That is, the extended portion of the vapor barrier 105 (e.g., distance 130) can be placed over and sealed to the vapor barrier layer of an adjacent heating system using the adhesive strip 112. Likewise, the extended portion of the underlayment layer 120 (e.g., distance 125) can extend underneath an adjacent heating system. In some embodiments, the underlayment layer 120 may be thick enough that two layers of underlayment will cause an uneven floor. In such situations, the extended portion of the underlayment layer 120 (e.g., distance 125) can be omitted. An example of the overlapping configuration is also discussed with respect to FIG. 5.

The following specifications are exemplary only, and not limiting. A width 155 of the adhesive strip 112 can be between 0.5 and 0.75 inches. The distance 160 of the thin radiant heater 115 can be between 11 and 48 inches. A thickness of the underlayment layer 120 can be between 0.08 and 0.25 inches. A thickness of the vapor barrier layer 105 can be between 0.003 and 0.010 inches. The extended width 130 of the vapor barrier 105 over a transversal side of the thin film radiant heater 115 can be between 6 and 9 inches. The extended width 125 of the vapor barrier 120 over the opposing transversal side of the thin film radiant heater 115 can be between 2 and 6 inches. Other thickness and the widths are also possible.

Figure 4:
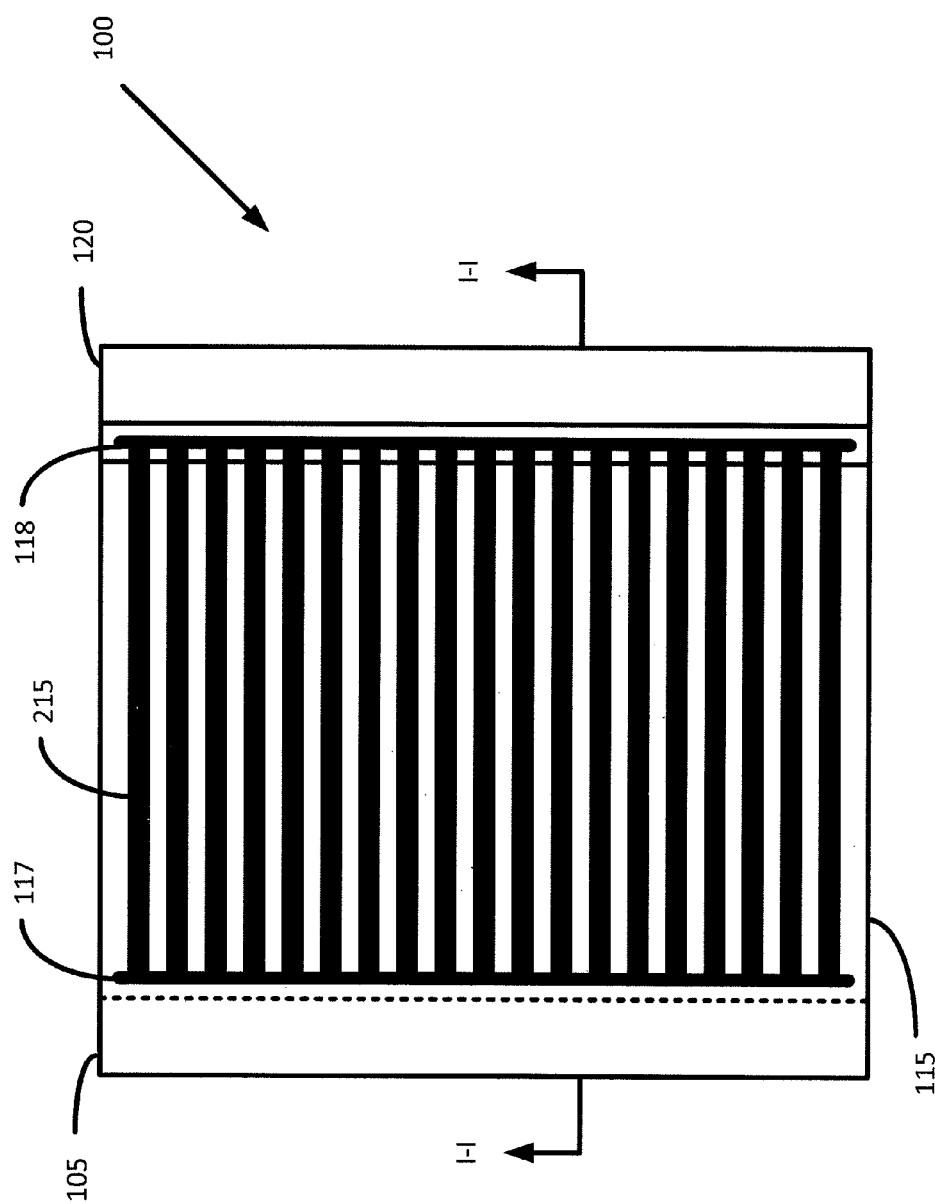
FIG. 4 shows a top down view of an exemplary underlayment heating system in accordance with another embodiment of the disclosed subject matter.

Referring to FIG. 4, a top down view of an exemplary heating system 100 is shown. For purposes of illustration, it is assumed that the vapor barrier 105 and adhesive 112 is clear, allowing visualization of the thin film radiant heater 115. The thin film radiant heater 115 can include a paper or plastic substrate having placed thereupon i) longitudinal bus bar electrodes 117 and 118 extending parallel to and spaced apart from each other and ii) a plurality of radiant heating elements configured as stripes 215 spaced apart from each other and extending between and electrically connected to the bus bars 117 and 118. Preferably, the resistance of the stripes 215 is much greater than that of the bus bars 117 and 118. The substrate, the resistive ink pattern printed thereon (e.g., stripes 215), and electrodes (if present) can be hermetically sealed between a pair of thin plastic sheets such as a polyester dielectric insulator. Electric leads (e.g., a crimp-on connector) can connect the thin film radiant heater 115 to a controller and/or power source.

The bus bars 117 and 118 are configured to provide electricity to the stripes 215 and can be formed using different methods. In one embodiment, the bus bars 117 and 118 can be formed by printing a pair of longitudinal stripes on the substrate using, for example, a silk-screening and/or ink jet process and resistive ink (e.g., semi-conductive ink, such as a colloidal graphite ink, that generates heat when electricity passes through it). In other embodiments, the bus bars 117 and 118 can be electrodes made of copper electrodes (or any other electrically conductive metal) that are attached to the substrate. In other embodiments, the bus bars 117 and 118 can be made of a combination of resistive ink and conductive electrode and/or can be made of resistive ink alone. For example, a copper electrode can be placed on top of a longitudinal stripe printed on the substrate.

The stripes 215 are preferably formed by printing a pattern on the substrate using electrically resistive ink. The printing can be performed by, for example, silk screening and/or ink jet printing. Preferably, the stripe configuration 215 extends in substantially parallel straight lines with spaces therebetween, although other configurations are possible (e.g., at an angle, offset, curved, etc.). Preferably, the stripe configuration 215 has a substantially uniform thickness (e.g., 0.0025 cm).

In the configuration shown in FIG. 4, the longitudinal bus bar 117 can act as an electrically positive or negative bus, and the longitudinal bus bar 118 can act as an electrically opposite bus to bus 117, thus providing a potential difference for a flow of electricity through the stripes 215. An exemplary embodiment of the thin film radiant heater 115 can be found at col. 2, 1. 23 through col. 4, 1. 21 of U.S. Pat. No. 4,485,297. U.S. Pat. No. 4,485,297 is incorporated by reference herein in its entirety.

The spacing of the stripes 215 can be configured to cause substantially uniform heating. For example, the width of each bar 215 can be greater than the space between adjacent bars, and the space between bars 215 can be less than an inch, preferably in the range of about ⅛" to 1". The widths of the bars 215 are typically in the range of about ⅛" to about 2", preferably about ¼" to ½", although other widths are possible. Other pattern designs for the arrangement of the thin film radiant heater 115 are possible, such as those disclosed in FIGS. 4A, 4B, 4C, and 8-11 of U.S. Pat. No. 4,485,297, which are incorporated by reference herein.

The thin film radiant heater 115 can also include electrodes connected to copper stripes extending from an end of the longitudinal bus bars 117 and 118. Generally, as described at, for example, col. 3, 11. 56-59 of U.S. Pat. No. 4,485,297, which is incorporated by reference herein, the electrodes can provide an electrical connection between the thin film radiant heater 115 and a control unit, which can be, in turn, connected to a power source. The thin film radiant heater 115 can be configured to operate at many different voltages such as, for example, in a range of 5-5000V, but preferably in a range of 100V-277V.

The bus bars 117 and 118 and the stripes 215 can be self-regulating in order to avoid hot spots. For example, in some circumstances excessive heat can build up in localized sections of the thin film radiant heater 115 (e.g., under a piece of furniture). In one embodiment, where the bus bars 117 and 118 and/or the stripes 215 are constructed of resistive ink, the chemical composition of the resistive ink can be configured such that as the temperature of the ink increases, the resistance of the ink becomes higher causing less heat to be generated by the ink in that area. In other words, the ink itself can be configured to self-regulate (e.g., chemically) in order to avoid localized hot spots in the thin film radiant heater 115.

Figure 5:
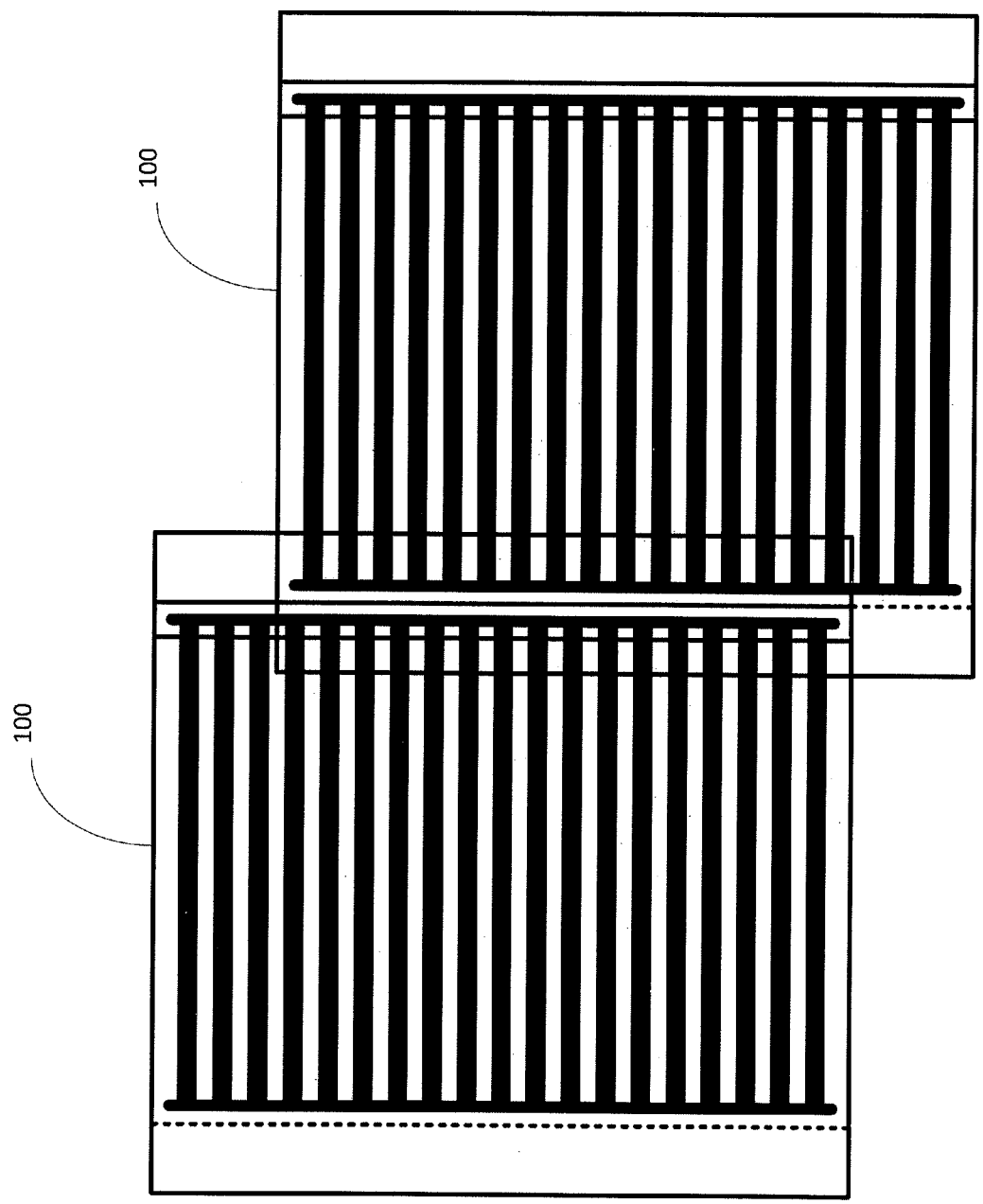
FIG. 5 shows a top down view of an exemplary installation of an underlayment heating system in accordance with an embodiment of the disclosed subject matter.

Referring to FIG. 5, two adjacent and partially overlapping underlayment heating systems 100 are shown. The underlayment heating system 100 on the right can be laid partially on top of the underlayment heating system 100 on the left. Preferably, when the heating systems 100 are overlapped, they are overlapped such that the thin film radiant heaters 115 contained therein do not overlap. As the heating systems 100 are overlapped, the adhesive strip 112 can bond the two heating systems together. This configuration of multiple heating systems using the adhesive strip 112 can allow several rows of the heating system 100 to be placed next to one other such that a continuous vapor barrier under the floor 10 is formed.

Figure 6:
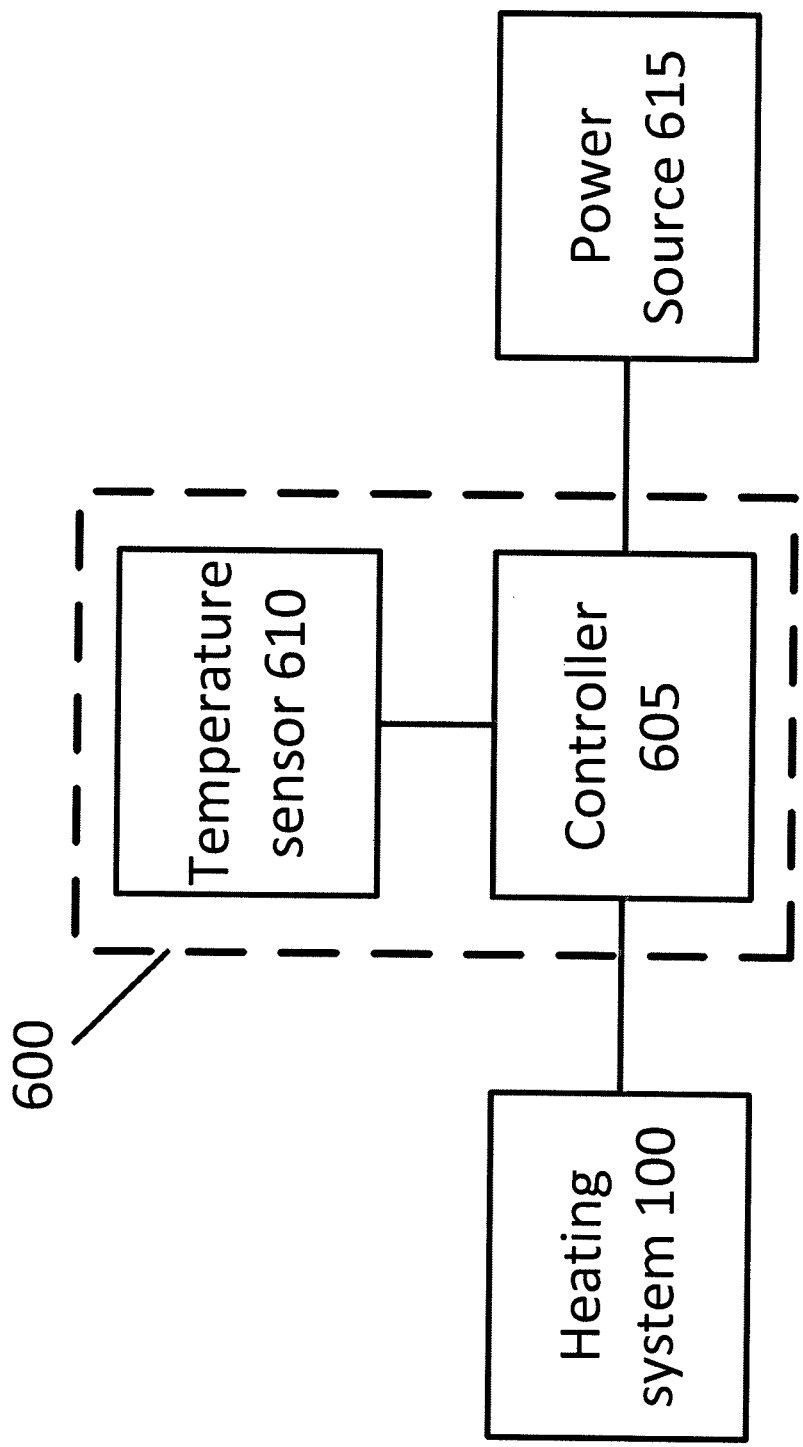
FIG. 6 shows an exemplary control system in accordance with an embodiment of the disclosed subject matter.

Referring to FIG. 6, the heating system 100 can be controlled by an automated control system 600 that includes a controller 605 and a temperature sensor 610. Preferably, the controller 605 is coupled to a power source 615 and to the temperature sensor 610. The sensor 610 can be configured to sense ambient air and/or floor temperature. The controller 605 can be configured as a thermostat that measures the temperature of the indoor ambient air and/or the floor using the sensor 610. A user can set a desired temperature for the ambient air and/or floor. When the set temperature is exceeded, the controller 605 can turn off the heating system, or alternatively, provide it with less electricity to limit the heat generated. When the set temperature exceeds the ambient and/or floor temperature, the controller 605 can turn on the heating system, or alternatively, provide it with more electricity to generate additional heat. The controller 605 can also be controlled manually by a user. A single control system 600 can be used to control a plurality of the underlayment heating systems 100 and/or separate control systems 600 can be used to control respective underlayment heating systems 100. A plurality of the underlayment heating systems 100 can be connected together in series, parallel, and/or a series-parallel configuration to the power source.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations. While the foregoing description shows an overlap portion on both transversal edges of the underlayment system, the underlayment heating system 100 can include only a single overlap portion along one of the transversal edges. The underlayment heating system 100 can also include one or more overlap portions along its transverse edges as well.

It is noted that one or more references are incorporated herein. To the extent that any of the incorporated material is inconsistent with the present disclosure, the present disclosure shall control. Furthermore, to the extent necessary, material incorporated by reference herein should be disregarded if necessary to preserve the validity of the claims.

Further, while the description above refers to the invention, the description may include more than one invention.

Notwithstanding the specific portions identified above, each of U.S. Pat. Nos. 4,485,297 and 4,733,059 is incorporated by reference herein in its entirety.

What is claimed is:
1. An underlayment heating system for use with flooring, the system comprising:
  an underlayment layer;
  a vapor barrier layer;
  a thin film radiant heater layer positioned between at least part of the underlayment layer and at least part of the vapor barrier layer, wherein the thin film radiant heater layer comprises:
    a substrate;

a conductive resistive ink pattern disposed on the substrate, wherein the ink pattern generates heat when electricity flows through the resistive ink pattern;

wherein the underlayment layer includes a first overlap portion and the vapor barrier layer includes a second overlap portion, the first overlap portion and the second overlap portion extending along opposing longitudinal edges of the system such that the first overlap portion is configured to extend underneath a first adjacent underlayment heating system and the second overlap portion is configured to be placed over a vapor barrier layer of a second adjacent underlayment heating system, and wherein the thin film radiant heater layer is positioned between the underlayment layer and the vapor barrier layer such that the resistive ink pattern is disposed outside of the first overlap portion and the second overlap portion.

2. The underlayment heating system of claim 1 further comprising a pressure sensitive adhesive strip disposed on the vapor barrier layer and configured to bond the vapor barrier layer with a second overlap portion of the first adjacent underlayment heating system.

3. The underlayment heating system of claim 1 further comprising at least one of pressure sensitive adhesive and heat activated adhesive to bond the thin film radiant heater to the vapor barrier layer and the underlayment layer.

4. The underlayment heating system of claim 1 wherein the vapor barrier is made from at least one of polyethylene and treated paper.

5. The underlayment heating system of claim 1 wherein the resistive ink pattern comprises:
   a pair of longitudinal bus stripes spaced apart from each other; and
   a plurality of transverse stripes spaced apart from each other and extending between and electrically connected to the pair of longitudinal bus stripes.

6. The underlayment heating system of claim 1 wherein:
   the thin film radiant heater further comprises a pair of longitudinally extending busses made of an electrically conductive metal; and
   the resistive ink pattern comprises a plurality of transverse stripes spaced apart from each other, extending between the longitudinally extending busses, and electrically coupled to the pair of longitudinally extending busses.

7. The underlayment heating system of claim 1 further comprising a controller configured to control the flow of electricity to the thin film radiant heater as a function of at least one of air temperature and floor temperature.

8. The underlayment heating system of claim 1 wherein a transverse measurement of the second overlap portion is greater than a transverse measurement of the first overlap portion.

9. The underlayment heating system of claim 1 further comprising an electrical connector connected to the thin firm radiant heater.

10. The underlayment heating system of claim 1 wherein the resistive ink is configured such that, as the temperature of the resistive ink increases, the resistance of the ink increases.

11. A heated flooring system comprising:
   a plurality of underlayment heating systems disposed on a subfloor in a partially overlapping arrangement, wherein each underlayment heating system includes:
      an underlayment layer;
      a vapor barrier layer;
      a thin film radiant heater layer positioned between at least part of the underlayment layer and at least part of the vapor barrier layer, wherein the thin film radiant layer heater comprises:
         a substrate;
         a conductive resistive ink pattern disposed on the substrate, wherein the resistive ink pattern generates heat when electricity flows through the resistive ink pattern; and
      wherein the underlayment layer includes a first overlap portion and the vapor barrier layer includes a second overlap portion, the first overlap portion and the second overlap portion extending along opposing longitudinal edges of the system such that the first overlap portion is configured to extend underneath a first adjacent underlayment heating system and the second overlap portion is configured to be placed over a vapor barrier layer of a second adjacent underlayment heating system, and
      wherein the thin film radiant heater layer is positioned between the underlayment layer and the vapor barrier layer such that the resistive ink pattern is disposed outside of the first overlap portion and the second overlap portion.

12. The heated flooring system of claim 11 wherein each underlayment heating system further includes a pressure sensitive adhesive strip disposed on the vapor barrier layer and configured to bond the vapor barrier layer with a second overlap portion of the first adjacent underlayment heating system.

13. The heated flooring system of claim 11 wherein each underlayment heating system further comprises at least one of pressure sensitive adhesive and heat activated adhesive to bond the thin film radiant heater to the vapor barrier layer and the underlayment layer.

14. The heated flooring system of claim 11 wherein the vapor barrier is made from at least one of polyethylene and treated paper.

15. The heated flooring system of claim 11, wherein the pattern of conductive resistive ink comprises:
   a pair of longitudinal bus stripes spaced apart from each other; and
   a plurality of transverse bars spaced apart from each other and extending between and electrically connected to the longitudinal bus bars.

16. The heated flooring system of claim 11, wherein:
   the thin film radiant heater further comprises a pair of longitudinally extending busses made of an electrically conductive metal; and
   the resistive ink pattern comprises a plurality of transverse stripes spaced apart from each other, extending between the longitudinally extending busses, and electrically coupled to the pair of longitudinally extending busses.

17. The heated flooring system of claim 11 further comprising a controller configured to control the flow of electricity to the thin film radiant heater as a function of at least one of air temperature and floor temperature.

18. The heated flooring system of claim 11 wherein a transverse measurement of the second overlap portion is greater than a transverse measurement of the first overlap portion.

19. The heated flooring system of claim 11 wherein the thin film radiant heater further comprises an electrical connector connected to the thin film radiant heater.

20. The heated flooring system of claim 11 wherein the resistive ink is configured such that, as the temperature of the resistive ink increases, the resistance of the ink increases.

\* \* \* \* \*